(12) United States Patent
Livshits et al.

(10) Patent No.: US 7,933,946 B2
(45) Date of Patent: Apr. 26, 2011

(54) DETECTING DATA PROPAGATION IN A DISTRIBUTED SYSTEM

(75) Inventors: Benjamin Livshits, Kirkland, WA (US); Weidong Cui, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 573 days.

(21) Appl. No.: 11/767,312

(22) Filed: Jun. 22, 2007

(65) Prior Publication Data
US 2008/0320075 A1    Dec. 25, 2008

(51) Int. Cl.
*G06F 15/16* (2006.01)
(52) U.S. Cl. ........ 709/200; 709/225; 370/250; 714/100; 713/188
(58) Field of Classification Search .................. 709/200, 709/225; 370/250; 714/100; 713/188
See application file for complete search history.

(56) References Cited

U.S. PATENT DOCUMENTS

| | | | | |
|---|---|---|---|---|
| 6,016,501 | A * | 1/2000 | Martin et al. ................. | 707/203 |
| 7,412,508 | B2 * | 8/2008 | Jagerbrand et al. ........... | 709/224 |
| 2004/0107267 | A1 * | 6/2004 | Donker et al. ................ | 709/218 |
| 2004/0172557 | A1 * | 9/2004 | Nakae et al. .................. | 713/201 |
| 2005/0108415 | A1 | 5/2005 | Turk et al. | |
| 2005/0188215 | A1 | 8/2005 | Shulman et al. | |
| 2005/0205658 | A1 * | 9/2005 | Baker et al. ................... | 235/375 |
| 2006/0128406 | A1 | 6/2006 | Macartney | |
| 2006/0206300 | A1 | 9/2006 | Garg et al. | |
| 2006/0212572 | A1 | 9/2006 | Afek et al. | |
| 2006/0248129 | A1 * | 11/2006 | Carnes et al. ................. | 707/204 |
| 2006/0256729 | A1 | 11/2006 | Chen et al. | |
| 2007/0067682 | A1 | 3/2007 | Fang | |

FOREIGN PATENT DOCUMENTS

| | | |
|---|---|---|
| WO | WO2006107712 A2 | 10/2006 |
| WO | WO 2007002838 A2 * | 1/2007 |
| WO | WO2007002838 A2 | 1/2007 |

OTHER PUBLICATIONS

Developer Documentation: TrackBack Technical Specification Authors: Six Apart, http://www.sixapart.com version: 1.2.*
Sumeet Sing, et al., "Automated Worm Fingerprinting," Department of Computer Science and Engineering, University of California, San Diego, available at http://www.cs.ucsd.edu/~savage/papers/OSDI04.pdf (PDF enclosed entitled "Article 1," 16 pgs.).

(Continued)

*Primary Examiner* — Thu Nguyen
*Assistant Examiner* — Tauqir Hussain
(74) *Attorney, Agent, or Firm* — Workman Nydegger (57) ABSTRACT

Embodiments gather historical information about data propagation by monitoring requests to and replies from a server. When a request is received from a client system to upload code onto a web site, a user identity associated with the client system is determined and a tag that uniquely identifies the uploaded data is created and mapped with the user identity into a propagation graph. The propagation graph includes nodes and edges associated with a number of client systems that made similar requests such that each node of the propagation graph corresponds to both a tag and user identity of a client system and edges within the propagation graph represent causality links between the nodes. The propagation graph can then be used for finding long propagation chains, which can be useful for detecting worm-like propagation activity.

19 Claims, 3 Drawing Sheets

OTHER PUBLICATIONS

Steve Martin, et al., "Semi-Supervised Learning on Email Characteristics for Novel Worm Detection," University of California, Berkeley, available at http://stevezero.com/eecs/papers/261_martin_sewani.pdf (PDF enclosed entitled "Article 2," 12 pgs.).

Dag Christofferson, et al., "Worm Detection Using Honeypots," Norwegian University of Science and Technology, Department of Telematics, Jun. 2006, available at http://www.diva-portal.org/diva/getDocument?urn_nbn_no_ntnu_diva-1076-1_fulltext.pdf (PDF enclosed entitled "Article 3," 154 pgs.).

Dag Christofferson, et al., "Worm Detection Using Honeypots," Norwegian University of Science and Technology, department of Telematics, Jun. 2006. 154 pages.

Steve Martin, et al., "Semi-Supervised Learning on email Characteristics for Novel Worm Detection," University of California, Berkeley. 2005, 12 pages.

Sumeet Singh, et al., "Automated Worm Fingerprinting," Department of Computer Science and Engineering, University of California, San Diego, 2004, 16 pages.

* cited by examiner

DETECTING DATA PROPAGATION IN A DISTRIBUTED SYSTEM

CROSS-REFERENCE TO RELATED APPLICATIONS

N/A

BACKGROUND

Web applications have been a prime target for application-level security attacks for several years. A number of attack techniques have emerged, including SQL injections, cross-site scripting, path traversal, cross-site request forgery, HTTP splitting, etc. Further, recent surveys have shown that the majority of Web sites in common use contain at least one Web application security vulnerability. In fact, in the last several years, Web application vulnerabilities have become significantly more common than vulnerabilities enabled by unsafe programming languages such as buffer overruns and format string violations.

While Web application vulnerabilities have been around for some time and some solutions have been developed, the recent popularity of interactive Web applications (e.g., "Asynchronous JavaScript and XML" (AJAX) based Web 2.0) has given rise to a new and potentially much more destructive breed of security threats typically called JavaScript worms. JavaScript worms and the like are enabled by cross-site scripting vulnerabilities in a widely used Web application. While cross-site scripting vulnerabilities have been a common problem in Web based-applications for some time, their threat is now significantly amplified with the advent of interactive Web technology, e.g., AJAX. AJAX allows HTTP requests to be issued by the browser on behalf of the user. It is no longer necessary to trick the user into clicking on a link, as the appropriate HTTP request to the server can just be manufactured by the worm at runtime. This functionality can and has been cleverly exploited by hackers to create self-propagating malicious JavaScript.

One of the first and infamous worms to date is the Samy worm that was released in a popular social networking site. By exploiting a cross-site scripting vulnerability in the site, the worm added close to a million users to the worm author's "friends" list. According to site maintainers, the worm caused an explosion in the number of entries in the friends list across the site, eventually leading to resource exhaustion. Two days after the attack the site was still struggling to serve requests at a normal pace.

The Samy worm gets its name from the login name of its creator. Initially, the malicious piece of JavaScript (referred to as the payload) was manually placed in Samy's own profile page, making it infected. Each round of subsequent worm propagation consists of the following two steps.

First Download: A visitor downloads an infected profile and automatically executes the JavaScript payload. This adds Samy as the viewer's "friend" and also adds the text "but most of all, samy is my hero" to the viewer's profile. Normally, this series of steps would be done through GET and POST HTTP requests manually performed by the user by clicking on various links and buttons embedded in the site pages. In this case, all of these steps are done in the background without the viewer's knowledge.

Second Propagation: The payload is extracted from the contents of the profile being viewed and then added to the viewer's profile. Note that one of the enabling characteristics of a worm is the interactive technique, e.g., AJAX propagation step. Unlike "oldstyle" Web applications, such techniques allow requests to the server to be done in the background without a user's knowledge. Without interactive programs such as AJAX, a worm such as Samy would be nearly impossible. Also observe that worm propagation happens among properly authenticated social networking site users because only authenticated users have the ability to save the payload in their profiles.

While Samy is a relatively benign proof-of-concept worm, the impact of similar type worms is likely to grow in the future. In fact, nowadays cross-site scripting vulnerabilities are routinely exploited to allow the attacker to steal the credentials of a small group of users for financial gain. Self-propagating code amplifies this problem far beyond its current scale. It is therefore important to develop a detection scheme for these types of worms before they become commonplace.

A comprehensive detection solution for such worms, however, presents a tough challenge. The server-side Web application has no way of distinguishing a benign HTTP request performed by a user from one that is performed by a worm using self-propagating code. An attractive alternative to server-side detection may be to have an entirely client-side solution. Similarly, however, the browser has no way of distinguishing the origin of a piece of code since benign code embedded in a page for reasons of functionality is treated the same way as the payload of a worm. In addition, filtering solutions proposed so far that rely on worm signatures to stop their propagation are ineffective when it comes to polymorphic or obfuscated payloads, which are easy to create. In fact many worms detected so far are in fact obfuscated. Moreover, overly strict filters may cause false positives, leading to user frustration if they are unable to access their own data on a popular Web site.

BRIEF SUMMARY

The above-identified deficiencies and drawback of current worm detection techniques are overcome through example embodiments of the present invention. For example, embodiments described herein provide for a system that can gather historical information about data propagation by monitoring requests to and replies from a server. More specifically, requests and replies are uniquely tagged, and user identity information gathered, to create a propagation graph that can be used for determining such things as how many requests to upload data have been made and/or where the requests originated. Note that while this technique can be used for worm detection, it is also useful for any system interested in data propagation in a distributed system. Further note that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One example embodiment provides for a mechanism for gathering historical information about data propagation by monitoring requests to and replies from a server. When a request is received from a client system to upload data onto a web site, a user identity (e.g., IP address) associated with the client system is determined. In addition, a tag that uniquely identifies the uploaded data is created and mapped with the user identity into a propagation graph. The propagation graph includes nodes and edges associated with a number of client systems that made a request to upload data to the web site such that each node of the propagation graph corresponds to both a tag and user identity of a client system and edges within the propagation graph represent causality links between the nodes. The propagation graph can then be used for such things as determining an approximation of how many requests for uploading data to the web site have been made, where the requests originated, etc.

In an additional embodiment, the uploaded data with the tag are sent to a server for the web site. Accordingly, when a request is received from another client system to download the data from the web site, the data is identified as including the tag, which uniquely identifies a node within the propagation graph. The downloaded data is sent to the new client, which subsequently sends a new request to upload other data associated with the same web site where the data was previously downloaded with the tag. An identity associated with the new client systems is identified and a different tag is created that uniquely identifies the newly uploaded data. Similar to before, the new tag and the new identity are mapped to the propagation graph such that the old tag is linked with the new one. The updated propagation graph can then be used to determine such things as an approximation of how many requests for uploading data to the web site have been made, where the requests originated, etc., and the process continues. Note that in one embodiment, when the size of the propagation graph between two nodes gets too large, the system is considered infected by a worm and appropriate action can be taken.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantageous features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for gathering historical information about data propagation by monitoring requests to and replies from a server. The embodiments of the present invention may comprise a special purpose or general-purpose computer including various computer hardware or modules, as discussed in greater detail below.

It should be noted that although the goal of some embodiments described herein is to protect Web site users from the adverse effects of worm propagation, example embodiments extend beyond this scope. For example, the use of data propagation can have many uses such as in copy right enforcement, user information exploitation, etc. Accordingly, the purpose of using the historical information gathered for purposes of worm detection are used herein for illustrative purposes only. Similarly, as can be appreciated, the system described herein can be utilized to combat any number of worms; and therefore, any specific mention of a particular type of worm or other exploitation of a vulnerability is used herein for illustrative purposes only and is not meant to limit or otherwise narrow the scope of embodiments described herein unless specifically claimed.

In accordance with one embodiment, mechanisms gather historical information by tagging requests and responses so that the content that is copied across a range of pages can be traced. More specifically, embodiments provide a proxy or other module that inspects the traffic between a user's browser and a Web server. This tagging scheme can be thought of as a form of distributed tainting: whenever content that includes code (e.g. HTML) is uploaded to a server, the proxy modifies it to attach a tag invisible to the end-user. The tag is preserved on the server and is contained in the page (e.g., HTML) downloaded by subsequent requests. With every code (e.g., HTML) upload, embodiments also record an identity or identifier (e.g., an IP address) of the client issuing the request. In subsequent downloads of the page and uploads of content associated with the web page are made, a propagation graph is created that uniquely identify clients as uploading content to the server and shows causality links between them. Further embodiments also provide a client-side browser plugin or similar component so that tags are propagated at the transport (e.g., HTTP) protocol level and cannot be removed by code aware of this tagging scheme. A different embodiment may inject JavaScript code to carefully track tag propagation, whenever the user clicks on links or sends requests back to the server using AJAX requests.

In one embodiment, the proxy looks for long propagation paths (i.e., exceeding some distance between nodes of the propagation graph). Such detection mechanism is designed to scale to propagation graphs consisting of thousands of nodes with minimal overhead on every request. Whenever a long propagation chain is detected, embodiments disallow further uploads that are caused by that chain, thereby containing further worm propagation. Such detection module is designed to detect propagation activity that affects multiple users.

Although more specific references to advantageous features are described in greater detail below with regards to the Figures, embodiments within the scope of the present invention also include computer-readable media for carrying or having computer-executable instructions or data structures stored thereon. Such computer-readable storage media can be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable transmission medium. Thus, any such connection is properly termed a computer-readable transmission medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modules running on a computing system.

Figure 1:
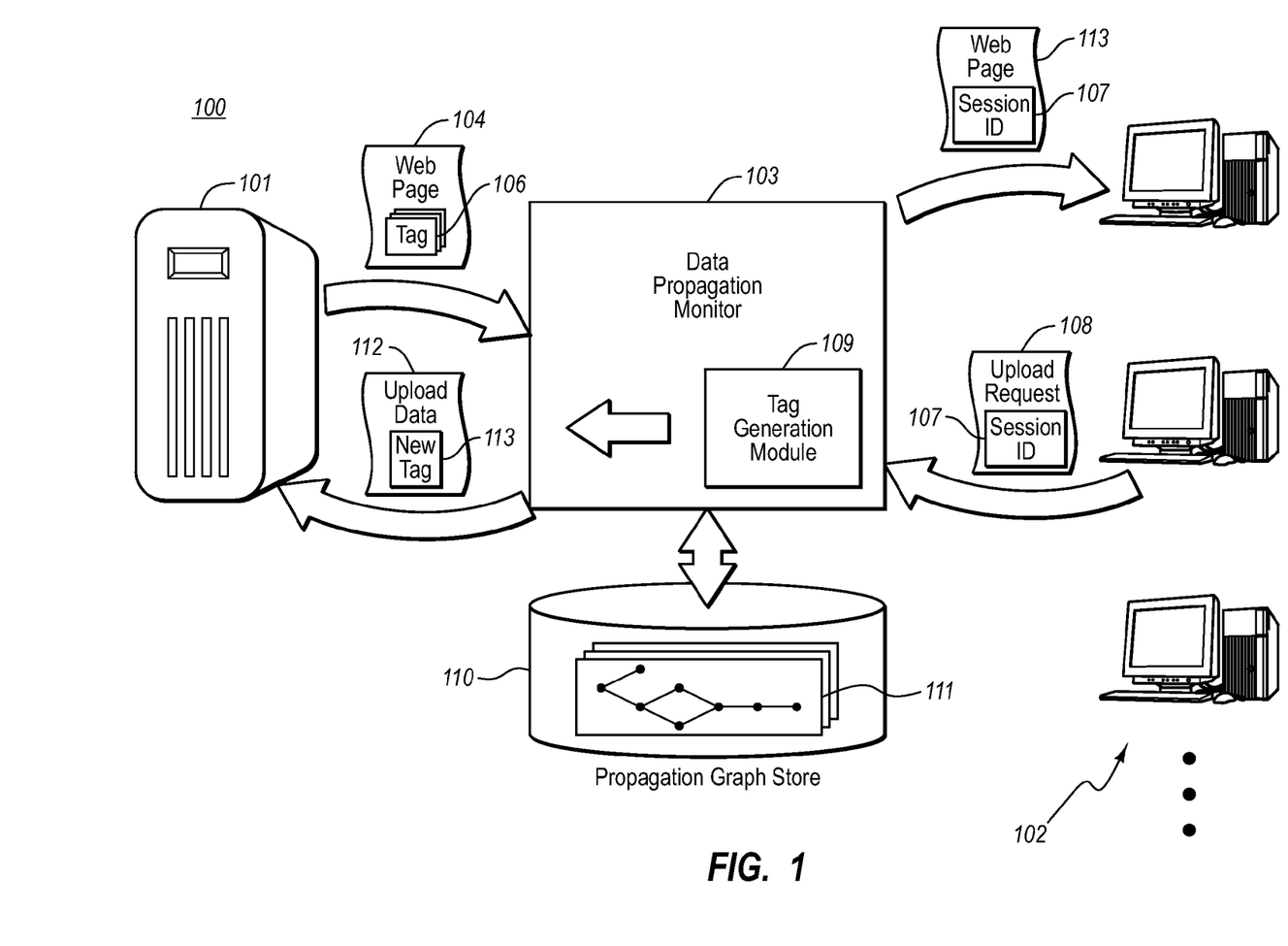
FIG. 1 illustrates a distributed system that utilizes a data propagation graph in order to monitor and control data flow between a server and multiple clients in accordance with example embodiments.

FIG. 1 illustrates a distributed computing system architecture 100 in accordance with example embodiments. Whenever a user or client 102 attempts to download a tagged 106 web page 104 from a server 101, the following steps are taken. First, the tagged 106 page 104 is retrieved from the server 101. The data propagation monitor or proxy can then examine the page 104. If the page 104 contains tags 106, a new session ID 107 is created and associated with the list of tags 106 in the page. Note that the page 104 may have multiple tags 106 or a single tag 106. Next, regardless of the number of tags 106, the identified tags 106 will typically be stripped from the page 104. As will be described in greater detail below, this ensures that such tags 106 cannot be modified or otherwise discovered from malicious code that may be implemented on the client systems 102. The modified page 113 augmented with the session ID 107 is then passed to the browser of the requesting client 102.

Whenever an upload that typically includes code (e.g., HTML) is observed by the data propagation monitor 103, the following steps can be taken. First, a user or client 102 issues an upload request 108 (e.g., an HTTP request), which again may include code (e.g., HTML). Next, a client-side plugin or other similar module attaches the session ID 107 of the page 113 from which the request originates, i.e., if the session ID 107 exists. If the request 108 has a valid session ID 107 associated with it, the list of tags 106 it corresponds to is looked up and, for every tag 106, causality links are added to the propagation graph 111 in store 110 as described in greater detail below. In one embodiment (described in greater detail below) the request 108 is not propagated further if the data propagation monitor 103 detection module determines that the request is part of worm propagation (i.e., the propagation graph 111 exceeds some defined threshold). Nevertheless, other embodiments allow the request 112 augmented with the newly created tag 113 generated from tag generation module 109 to be uploaded and stored at the server 101.

In one embodiment, a worm detection module relies on the following from its environment. First: reliable code (e.g., HTML) input detection and marking or tagging. As mentioned above, embodiments can determine which user or client input (i.e., upload request 108) may contain code such as HTML and can mark or tag 113 it as tainted. Additionally, embodiments can mark suspicious upload requests 108 without disturbing server-side 101 application logic and so that the mark propagates to the user.

The above logic generally holds because worms such as JavaScript worms take advantage of a cross-site scripting vulnerability in the server for propagation. This essentially means that the server-side 101 application reflects the input or upload request 112 back, allowing data propagation monitor 103 to insert a mark or tag 113 that is persisted on the server 101. This embodiment also holds for the worms found in the wild. In the case of some known mail servers that filter to strip away some code (e.g., HTML) attribute; such server still allows the embedding of code (e.g., HTML) image elements, which is where one embodiment allows tags 113 to be inserted—although other areas of an upload request or web page may be utilized for attaching the tag 113. In the case of a worm where the upload request 108 is encoded using URL encoding and the server 101 does the decoding, embodiments provide tag 113 insertion module that considers encoded versions of code labels (e.g. HTML <and> brackets) and ensure the inserted tag 113 is idempotent with respect to URL encoding. Note that some embodiments focus on tagging code uploads; however, similar tagging of downloads are also contemplated herein.

Figure 2A:
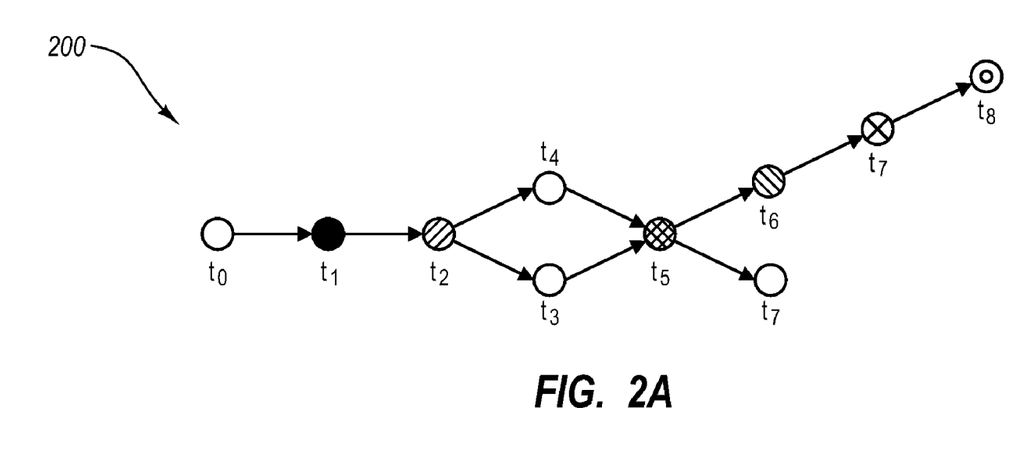
FIG. 2A illustrates a possible propagation diagram scenario that can utilize example embodiments described herein.
Figure 2B:
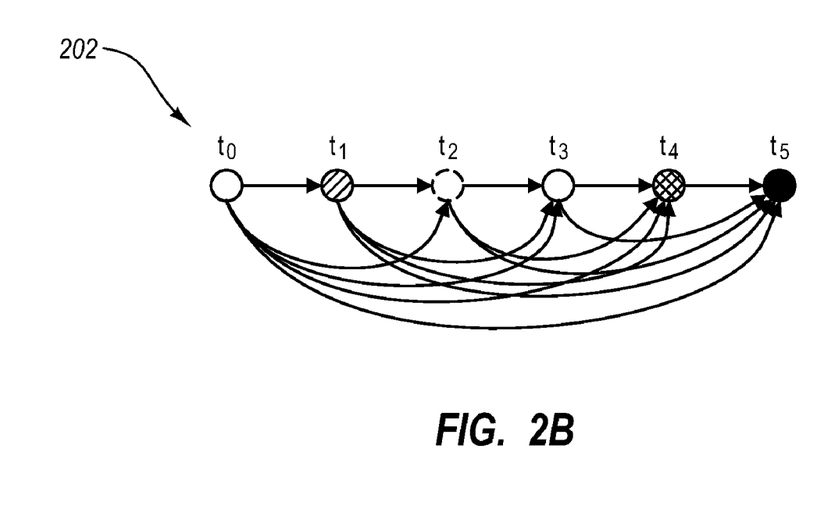
FIG. 2B illustrates a blog propagation diagram that can utilize example embodiments described herein.

Second: reliable client-side tag propagation. Client 102 browsers can propagate session IDs 107 from a response (e.g., HTTP) to a subsequent request. As mentioned above, one embodiment relies on a browser plugin to perform tag propagation. Tag propagation may also be implemented by injecting additional tracking JavaScript at the proxy or data propagation monitor 103. The following discussion of FIGS. 2A and 2B describe two common propagation scenarios. The first scenario in FIG. 2A is indicative of worm propagation, whereas the second in FIG. 2B is a common scenario that would cause a false positive in a more naive detection scheme. More specifically, FIG. 2A shows a tag propagation graph corresponding to a typical worm outbreak. Every graph node represents a different tag (i.e., client 102 identity and tag 113), edges represent tag causality. Finally, shades represent different client identities (e.g., an IP addresses). In the example shown, the longest path in this graph 200 is $t_0 \to t_1 \to t_2 \to t_3 \to t_5 \to t_6 \to t_7 \to t_8$. The number of unique identifiers (e.g., IP address) on this path is 7, not 8 since $t_0$ and $t_3$ represent the same identifiers. Also note that this is not a unique longest path: a path with $t_4$ instead of $t_3$ has the same length. Further note that if all activity for tags $t_0 \ldots t_8$ corresponded to the same client identity (e.g., same IP address), embodiments would not indicate a worm since no other user would get infected. Another important observation is that the path in question is in fact the shortest path connecting nodes $t_0$ and $t_8$. This graph is a small example of rapid worm propagation.

Contrast the worm propagation scenario with the following case of a blog entry with a long list of comments, whose propagation structure is shown in FIG. 2B. In this case, $t_0$ corresponds to the initial blog post, $t_1$ corresponds to the first reply, $t_2$ to the second reply, etc. Some of the replies can come from the same client or IP address, as exemplified by $t_2$ and $t_5$. Assuming the initial blog post is included in the HTML every time the blog entry is downloaded, to will be connected to every subsequent tag generated for the uploads. So, as a result, the shortest distance between nodes $t_0$ and $t_5$ will still be two. Naively flagging a long blog thread scenario as a worm would constitute a false positive. With blogging sites ubiquitous nowadays, flagging this scenario as a worm would generate a flood of false worm reports. In other words, as described herein, nodes are counted as part of the chain and/or added to the propagation graph based on uploads from uniquely identified clients, e.g., based on unique IP address; thus substantially limiting the number of false positives produced.

To formalize some of the embodiments described above, the following provides a more detailed description of a propagation graph that is updated whenever new tags are inserted. As in the examples above, each node of the graph corresponds to a tag and edges represent causality links. Each node carries with it an identity r identifier (e.g., the IP address) of the client the tag originates from. The following are definitions used to describe node propagation:

Definition 1. Propagation graph G=(V, ϵ), where vertices V is a set of tag-identifier (e.g., IP) pairs $\{(t_1, ip_1), (t_2, ip_2), \ldots\}$ and ϵ is the set of causality edges between them.

Definition 2. The distance between two nodes $N_1$ and $N_2$ denoted as $|N_1, N_2|$ in a propagation graph G is the smallest number of unique identifiers (e.g., IP addresses) on any path connecting $N_1$ and $N_2$.

Definition 3. The diameter of a propagation graph G, denoted as D(G), is the maximum distance between any two nodes in G.

Definition 4. A propagation graph G includes a worm if the D(G) exceeds a user-provided threshold d.

Note that the propagation graph is typically acyclic. While it is possible to have node sharing, caused by a page with two tags generating a new one, as shown in FIG. 2A, having a cycle in the propagation graph is virtually impossible, as it would indicate a tag caused by another one that was created chronologically later. In some embodiments worm detection is performed on the fly, whenever a new upload request is observed by data propagation monitor 103. When a new edge is added to the propagation graph G (111), embodiments check to see if the diameter of updated graph G (111) now exceeds the user-defined threshold d.

One issue that complicates the design of an efficient propagation mapping is the tracking of the set of unique identifiers (e.g., IP addresses) encountered on the current path from a root of the propagation graph. Unfortunately, computing this set every time an edge is added is exponential in the graph size. Further, storing the smallest set of unique IP addresses at every node requires $O(n^2)$ space. Even if these sets are stored at every node, the computation of the identifier (e.g., IP address) list at a node that has more than one predecessor still requires an exponential amount of work, as embodiments may consider all ways to traverse the graph to find the path with the smallest number of unique identifiers (e.g., IP addresses).

In another example embodiment, it is a goal to have a worm detection algorithm that is as efficient as possible. Since embodiments contemplate the detection of slow-propagating worms, old tags should typically not be removed from the propagation graph. Therefore, the embodiments scale to hundreds of thousands of nodes, representing tags inserted over a period of days, weeks, months, or even years. Accordingly, further embodiments propose two practical alternatives to the exponential detection mechanism outlined above: (1) an approximate incremental worm detection, which is described in greater detail below; and (2) precise delayed worm detection.

For the second approach, instead of trying to discover a worm outbreak on the fly as soon as it happens, an alternative may be to examine the propagation graph every once in a while to detect worm traces. In this case, the performance penalty is amortized over a large number of requests and worm detection can be done in a background process, for example, at a time when the load of the machine where the proxy is installed is low. In another embodiment, a forward depth-first search is provided that maintains a list of unique identifiers (e.g., IP addresses) along the current propagation path. The search starts at nodes that do not have a predecessor and at every reachable node, if the current set of unique identifiers is smaller than the one already at the node, the stored set can be replaced. The downside of running this computation occasionally is that embodiments may not be able to detect a worm outbreak as quickly. Also note that the two strategies outlined above may be combined: the approximation technique may be used as the proverbial canary in the mine shaft to trigger a whole-graph traversal that computes precise values.

The following describes an iterative or approximate mechanism for detecting when a newly added propagation graph edge indicates the propagation of a worm. As shown below, the approximation algorithm is conservative, meaning that if there is a worm, the approximation approach should detect it no later than the precise one.

The graph $G_A$ maintained by this embodiment is typically a forest approximating the propagation graph G. Whenever node sharing is introduced, one of the predecessors may be removed to maintain the single-parent property. Every node N in $G_A$ should have a set of identifiers (e.g., IP addresses) used in its predecessors IPS(N) associated with it. The number of identifiers stored at a node is at most c, where c is a user-configured parameter. Furthermore, to make the insertion mechanism more efficient, some of the nodes of the graph are designated as storage stations as follows.

At every node N a depth value denoted as for example DEPTH(N) is Maintained, which is an approximation of the number of unique identifiers (e.g., IP addresses) on the path from N to the root. The insertion mechanism can maintain the following representation invariants: (1) PREV(N) points to the nearest storage station on a path to the root node; (2) IPS(N) includes identifiers (e.g., IP addresses) that are not found on the path from PREV(N) to the root; and (3) for a node N that is not a storage station, IPS(N) is the set identifiers on the path from N to PREV(N).

The following pseudo-code for the approximate insertion mechanism defines the details of data structure manipulation. Note that the pseudo-code is provided for illustrative purposes only and is not meant to limit or otherwise narrow the scope of embodiments claimed herein. Thereafter is a summarization of some of

```
procedure InsertCausalityEdge(Node parent, Node child){
    if (parent.status = = INFECTED) {
        // worm already detected
        return;
    }
    if (child.parent != null){// case of sharing
        if (DEPTH (parent) > DEPTH(child.parent)) parent =
        child.parent;
    }
    Node current = parent, first = null;
    boolean found = false; int count = 0;
    do {
        if (current.isStorage && first = = null) {
            //storage station
```

```
            first = current;
        }
        if (!found && current.ipList.contains(child.IP)) found = true;
        count += IPS(current) .size);
        current = PREV(current);
    } while (current != null);
    if (first != null) {
        if (parent.isStorageStation) { // over capacity
            IPS(child) newIPList( );
        } else {
            IPS (child) = parent.ipList;
        }
        if (found) {
            DEPTH (child) = count;
        } else {
            IPS(child) = IPS(child) U child.IP;
            DEPTH(child) = count + 1;
            if (IPS(parent).size = = c) child.isStorageStation = true;
        }
        PREV(child) = first;
        if (DEPTH (child) > d && parent.status != FALSE_POSITIVE) {
            print("Potential worm detected");
            markTreeContaining(child, INFECTED);
        }
    } else { // parent is root of a new tree, child is only child
        IPS(parent) = newIPList( ); IPS(child) = newIPList( );
        parent.isStorageStation = true; PREV(child) = parent;
        DEPTH (parent) = 1; DEPTH(child) = 2;
    }
    parent. parent = child;
}
``` the embodiments described in the pseudo code. Note from the above, that whenever a new causality edge from node parent to node child is added to $G_A$: If parent is the only predecessor of child in $G_A$, the tree branch is traversed to find all storage stations on the current tree branch. DEPTH(child) is set to the sum of sizes of IPS(N) for all storage stations on the path. Next, IPS(parent) is copied into IPS(child) and then child's identifier (e.g., IP address) is added if it is not found by the search; DEPTH(child) value is also incremented. If the size of IPS(child) reaches threshold c, we designate child as a storage station.

On the other hand, if child has two predecessors in $G_A$, DEPTH values stored at the two predecessors are compared and the smaller one typically selected while the other edge may be removed from the graph, restoring non-sharing. After that the above steps for parent being the only predecessor are followed. Note that the predecessors do not have to belong to the same tree. However, after the insertion is complete, child should be a member of a single tree. Also observe that the maximum DEPTH value computed by this embodiment is exactly $D(G_A)$ because the maximum distance in $G_A$ is that between a node and a root.

Whenever the count at the newly added node child exceeds some threshold d, one example embodiment marks the entire tree that parent and child are contained in as infected. To do so, an additional status at every leaf is maintained. Whenever a tree is deemed infected, embodiments propagate the infected status to every tree node. Subsequently, all uploads that are caused by nodes within that tree are disallowed until there it is otherwise determined safe to do so. For example, when the server fixes the vulnerability that makes a worm possible, it can notify the data propagation monitor, at which point the monitor can remove the entire tree containing nodes parent and child from the proxy. Similarly, if it is determined that the vulnerability reported by the data propagation monitor is a false positive, one example embodiment provides for never subsequently reporting activity caused by nodes in that tree as a worm. Accordingly, the node status can be set for each tree node as a false positive and node status can be checked before reporting a worm.

The following provides a more detailed description of one specific implementation of the above process described in regards to FIG. 1. Although specific reference may be made to a certain protocol or other modules, such description is used for illustrative purposes only and is not meant to limit or otherwise narrow the scope of embodiments described unless otherwise explicitly claimed. As previously described above, embodiments provide a data propagation monitor 103 (e.g., a proxy) deployed on the network to intercept client-server 102-101 traffic and a browser plugin or other module that modifies client-proxy 102 traffic and maintains tags of downloaded pages in a manner invisible to any client-side code (e.g., JavaScript). Distributed tainting is accomplished with both the monitor 103 and the browser plugin cooperating with each other to create and maintain tags 106, 113. Note, however, that other configurations are contemplated as described in greater detail below. Accordingly, any specific location or labeling of modules and the functionality associated therewith is used herein for illustrative purposes only and is not meant to limit or otherwise narrow the scope of embodiments described unless explicitly claimed.

Each HTTP request is examined by the proxy looking for code, e.g., HTML content that is being uploaded. In one embodiment, anything containing <or > characters may be marked or their URL-encoded versions as potential HTML. In one embodiment, no attempt is made to detect the presence of JavaScript, which is a significantly more difficult, error-prone task; however, other embodiments allow for such detection. Requests such as GET and POST can be parsed by data propagation monitor 103 and/or other components and request parameters analyzed. Whenever such an HTML-containing parameter is detected, it can be augmented with a tag 113 similar to the form "monitor_name tag=t", where t is a freshly generated unique number that corresponds to this particular HTTP request. Typically embodiments use sequential tag numbers, although other schemes are possible in a distributed setting as described in greater detail below.

The newly generated tag 113 can be included within an HTML parameter (e.g., the first one). Note that generally one does not know which HTML-including parameters are used for payload propagation; so, embodiments include the same tag in all of them. To illustrate how tag insertion works, consider an HTTP request including parameter <div><b onclick="javascript:alert ('. . . ')". . . . </b></div> This parameter can be transformed by the proxy into a request containing
<div><b monitor_name tag=56 onclick="javascript:alert ('. . . ')". . . . </b></div>

Whenever a non-empty session ID comes from the browser, the list of tags ($t_1$, . . . , $t_n$) it corresponds to can be retrieved from the proxy 103 cache and the proxy cache entry removed. Node (client identifier or IP address, t) can then be added to $G_A$. To maintain a record of taint propagation, the proxy can also add edges ($t_1$, t) to the propagation graph $G_A$. Finally, the modified HTTP request with the new tag 113 is forwarded on to the server-provided of course that the maximum graph size has not been exceeded in accordance with some embodiments described herein.

The proxy or monitor 103 then examines the HTML content that is downloaded from the server looking for embedded tags 106. Note that multiple tags 106 may potentially be present. The set of tags 106 is extracted and temporarily associated in the proxy session cache with a freshly generated session ID. The marker tags are stripped from the HTML that contains them before being sent over to the browser. The session ID is added to the request sent to the server 101 as part of the HTTP response similar to that shown below.

> HTTP 1. 1 200 OK
> Session_ID: 344399821
> Date: Thu, 20 May
> 2004, 21:12:58 GMT
> Connection: close
> Server: Apache/1.3.27
> Accept-range: bytes
> Content-
> type:
> text/html
> Content-
> length: 170
> Last-modified: Tue, 18 May
> 2004, 21:12:58 GMT <html>
> </html>

Whenever a tagged page 104 is downloaded in the browser, the session ID for that page is extracted from the HTTP request by the plugin or other component. When a new request 108 is issued by a page loaded in the browser, the plugin attaches the session ID to the newly created outgoing HTTP request.

Embodiments work in both small-scale environments with servers that do not have a lot of activity and also with servers that have thousands of active users. More specifically, embodiments consider the following deployment models.

Server-side deployment is one way to protect an existing Web site from worms (e.g., JavaScript worms) or the like using embodiments described herein. Deploying the data propagation proxy in front of a server or servers that the site resides on allows the proxy to monitor all client-server interaction for that site and detect worms faster than it would in the case of being deployed elsewhere on the network and seeing only a portion of the total browser-server traffic. This model has the advantage of simplifying worm reporting, since the server is responsible for proxy maintenance. The server may also enforce that its users install the plugin or module for their browsers. Finally, the server may also communicate to the proxy which parameters are expected to accept code such as HTML and how to augment them properly.

Client-side deployment or intranet deployment can be used to protect users within an organization, such as a university or a small enterprise against worm outbreaks. In many cases, these environments are already protected by firewalls and the monitor or proxy can be easily integrated within that infrastructure. This type of deployment can be combined with requiring the users to install the browser plugin, a requirement that is more difficult to maintain in the case of server-side deployment. Of course, worm detection in this kind of deployment is typically only possible if sufficiently many intranet users get infected. However, in the case of intranet deployment, the same proxy can be used to prevent worms propagating on a wide variety of sites without change to the detection or tagging approaches described herein.

One technical issue with client-side deployment may be the use of Secure Socket Layer (SSL) connections, which are typically not handled by the monitor. However, SSL sessions are frequently only used for initial authentication in Web applications and it is easy to set up one's browser to redirect requests to the monitor for non-SSL connections. For server-side deployment though, the proxy or monitor can be placed before the SSL connection.

Browser plugin adoption specifies that example embodiments can work with legacy browsers that do not natively support tag propagation by injecting, e.g., tag-tracking JavaScript into the Document Object Model (DOM) at the proxy level. With adequate browser support for security hooks, JavaScript injection can provide a much more lightweight solution and equally reliable solution.

For large-scale server-side deployment, other embodiments may implement the data propagation monitor as part of the site's load balancer. Load balancing is a strategy used by most large-scale services. When dealing with multiple servers, one embodiment provides for distributing different trees in the forest $G_A$ across the different proxy servers. The load balancer considers the source node of the edge being added to decide which proxy to redirect the request to. To avoid maintaining explicit state at the load-balancer, such as a lookup map that maps the parent tag to the proxy server containing that tree, one embodiment provides for assigning the tag number after node insertion based on which proxy it goes into. For example, the last 5 bits of the tag may encode the number of the proxy to pass the request to. In the case of a node having more than one parent, one embodiment chooses between two parents based on the parent's depth as described above. When a proxy server is full and a new edge, whose parent resides on that proxy server is inserted, example embodiments migrate the newly inserted node to a different proxy server as a new tree. However, instead of the initial depth of one, the depth of the root node for that tree is computed through a standard computation strategy.

While this deployment strategy closely matches the setup of large sites, an added advantage is the fact that embodiments do not have to store the entire forest in memory of a single proxy. A similar distributed strategy may also be adopted for intranet-wide client-side deployment. Distributed deployment has the following important benefit: an attacker might try to avoid detection by flooding the data propagation monitoring system with coded uploads, leading to memory exhaustion, and then unleashing a worm. Distributed deployment prevents this possibility.

Note that although the above deployment styles were classified in terms of large or small scale sizes, such deployment mechanisms can be used in any environment. Further, as previously mentioned, although mechanisms described herein are designed for detection of worm propagation or other vulnerability detection, embodiments herein can be used for any type of data propagation interest. For example, the historical data stored within the propagation graph may be used for limiting or monitoring the propagation of copyrightable material or other such interests. Accordingly, specific implementations—such as where the mechanisms described herein are deployed and what they are used for—are used herein for illustrative purposes only and are not meant to limit the scope of embodiments unless otherwise explicitly claimed.

The present invention may also be described in terms of methods comprising functional steps and/or non-functional acts. The following is a description of steps and/or acts that may be performed in practicing the present invention. Usually, functional steps describe the invention in terms of results that are accomplished, whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use of steps and/or acts in the recitation of the claims—and in the following description of the flow diagram for FIG. 3—is used to indicate the desired specific use of such terms.

Figure 3:
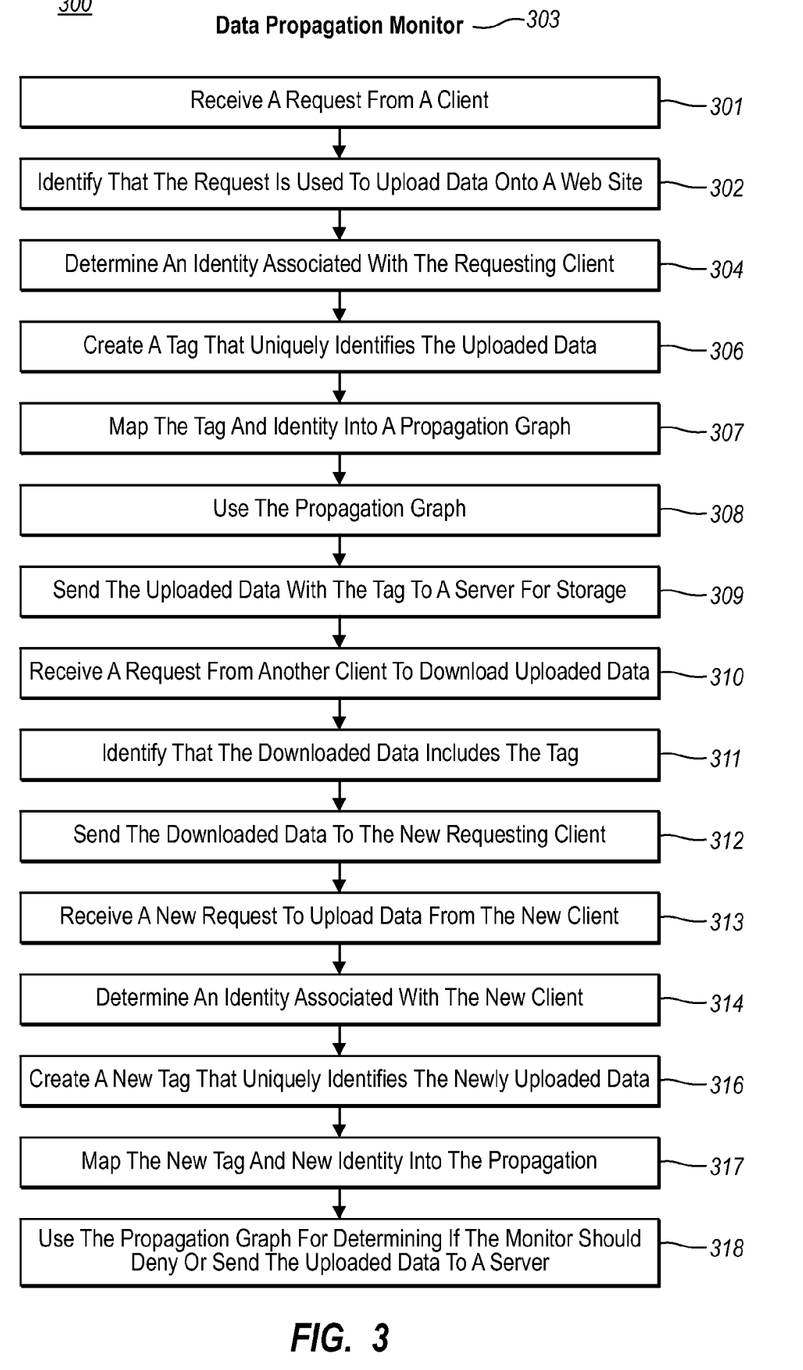
FIG. 3 illustrates a flow diagram of a method of using historical information within a propagation graph to monitor data flow in accordance with example embodiments.

As previously mentioned, FIG. 3 illustrates a flow diagram for various exemplary embodiments of the present invention. The following description of FIG. 3 will occasionally refer to corresponding elements from FIG. 1. Although reference may be made to a specific element from this Figure, such references are used for illustrative purposes only and are not meant to limit or otherwise narrow the scope of the described embodiments unless explicitly claimed.

From the perspective of data propagation monitor 303, FIG. 3 illustrates a Method 300 of using historical information about data propagation by monitoring requests to and replies from a server. Method 300 includes the steps of receiving 301 a request from a client and identifying 302 that the request is used to upload data onto a web site. For example, data propagation monitor 103 may receive upload request 108 that includes session ID 107 and identify that the request 108 is used to upload data onto a web site of server 101. The identifying that the request 108 is used to upload data may further include determining that the uploaded data includes HTML code, wherein the tag is included within one of the HTML elements within a parameter. For instance, the tag may be included in a first HTML element within the parameter. Method 300 also includes the steps of determining 304 an identity associated with the requesting client and creating 306 a tag that uniquely identifies the uploaded data. For example, data propagation monitor 103 may determine an IP address for client 102 that requests 108 the upload and generates a tag 113 using tag generation module 109 that uniquely identifies the uploaded data.

Method 300 further includes the steps of mapping 307 the tag and identity into a propagation graph and using 308 the propagation graph. For example, data propagation monitor 103 may map new tag 113 and the IP address of client 102 into propagation graph 111 in store 110 by associating the tag 113 and IP address to a node in the graph. Note that the graph 111 includes nodes and edges associated with numerous client systems that made a request to upload data to the web site such that each node of the propagation graph 111 corresponds to both a tag and identity of a client system and edges within the propagation graph 111 represent causality links between the nodes. Data propagation monitor 103 can then use the historical information within the graph 111 for determining such things as an approximation of how many requests for uploading data to the web site have been made, where the requests originated from, how the requests are linked, etc. For example, graph 111 may be used to dynamically check for cross-site scripting vulnerabilities such that if a length from a root node to another node of the graph grows beyond a predetermined threshold, further upload requests will be denied.

Note that each node in the propagation graph 111 can store multiple identities or IP addresses. In such an embodiment, each node also includes a depth value, which is an approximation of the number of unique identities on the path from that node to the root. Other example embodiments describe that the step of mapping the tag and the identity into the propagation graph further comprises: (A) identifying if a parent node is an only predecessor of a child node to be added with the tag and identity, wherein if true the method further comprises: (1) determining an identity size of storage station node(s) that include identity values up to a predefined threshold in the path from the parent node to the root node; (2) assigning a depth value for the child as a sum of determined identity sizes found in the storage stations node(s); (3) copying all identities in the parent node to the child node; and (4) adding the child node's identity if it is unique, wherein if so the method further comprises; (a) incrementing the depth value of the child node by one, wherein if size of identities in the child node equals the predefined threshold, the method further comprises: (i) designating the child node as a storage station node; or (B) identifying if the child node has more than one predecessors in the propagation graph, wherein if true the method comprises: (1) comparing depth values stored at each of the multiple predecessors; (2) selecting a node from the two predecessors with a smaller depth value for the two predecessors and assigning the node as a parent node to the child; (3) removing the edge between the child and the predecessor's node with a larger depth value than the minimum; (4) determining an identity size storage station node(s) that includes identity values up to the predefined threshold in the path from the parent node to the root node; (5) assigning a depth value for child as a sum of determined identity sizes found in the storage stations node(s); (6) copying all identities in the parent node to the child node; and (7) adding the child node's identity if it is unique, wherein if so the method further comprises; (a) incrementing the depth value of the child node by one, wherein if size of identities in the child node equals the predefined threshold, the method further comprises: (i) designating the child node as a storage station node.

In another example embodiment, if the added child node's depth value exceeds some threshold, the method further comprises: (1) marking a tree of the propagation graph associated with the child node and the parent node as infected by a worm; and (2) propagating the infected status to each node in the tree, such that all subsequent uploads that are caused by nodes within that tree are denied unless an indication is received that the infection has been resolved.

Method 300 may also include a step of sending 309 the uploaded data with the tag to a server for storage. For example, data propagation monitor may send the upload request and data 112 with the new tag 113 for storage at the server 101. Method 300 may then include steps of receiving 310 a request from another client to download at least a portion of the uploaded data stored on the server and identifying that the downloaded data includes the tag. For example, propagation monitor or proxy 103 may receive a request from one of the clients 102 to download web page 104 with tags 106, 113 of the uploaded data 112 stored on the server 101.

Method 300 then includes steps of identifying 311 that the downloaded data includes the tag that uniquely identifies a node within the propagation graph and sending 312 the downloaded data to the new requesting client. For example, data propagation monitor can identify that the web page 104 includes tags 106, 113 that relate to one or more nodes within the propagation graph 111. Note that typically before sending the web page to the requesting client 102, a session ID 107 is assigned to the downloaded data or web page 113 such that subsequent requests associated with the web site include the session ID 107 to correlate such requests with the web site and the propagation graph 111. Further, the tags 106, 113 are extracted from the downloaded data 113, and the web page 113 along with the session identifier is sent to the new requesting client 102.

Method 300 further includes steps of receiving 313 a new request to upload other data from the client and determining 314 an identity associated with the new client. For example, data propagation monitor 103 may receive from the new client 102 an upload request 108 that a plug-in attached the session ID 107 identifying the request 108 as corresponding to the previous web page 113 downloaded. The data propagation monitor 103 then determines an identity such as an IP address associated with the new requesting client 102. Thereafter Method 300 includes steps of creating 316 a new tag that uniquely identifies the newly uploaded data and mapping 317 the new tag and the new identity to the propagation graph. For example, data propagation monitor 103 uses tag generation module 109 to create a new tag 113, which is then mapped along with the IP address of the client 102 into the propagation graph 111 such that the old tag 113 and new tag 113 are linked together.

Finally Method 300 includes the step of using 318 the propagation graph for determining if the monitor should deny or send the uploaded data to the server. For example, data propagation monitor may use the propagation graph for determining such things as an approximation of how many requests for uploading data to the web site have been made, where the requests originated, etc. Based on the determination, the monitor or proxy 103 may be denying or sending the uploaded data with the new tag 113 to the server 101 for storage and subsequent retrieval from the client systems 102.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a distributed computing system, a method of using historical information about data propagation by monitoring HTTP protocol requests to and HTTP protocol replies from a server, the method comprising:
   receiving a HTTP protocol request from one of a plurality of client systems;
   identifying that the HTTP protocol request is used to upload data onto a web site;
   determining that the uploaded data comprises HTML data that includes HTML code;
   determining an identity associated with the one of the plurality of client systems;
   creating a tag that uniquely identifies the uploaded HTML data;
   inserting the tag into the HTML code;
   mapping the tag and the identity into a propagation graph, which includes nodes and edges associated with a plurality of client systems that made a HTTP protocol request to upload HTML data to the web site, such that each node of the propagation graph corresponds to both a tag and an identity of at least one of the client systems that made a HTTP protocol request to upload HTML data to the web site, and such that edges within the propagation graph represent causality links between the nodes, wherein each node in the propagation graph is configured to store multiple identities, wherein each node has a depth value, which is an approximation of the number of unique identities on the path from that node to the root, and wherein the mapping the tag and the identity into the propagation graph comprises:
      identifying if a parent node is an only predecessor of a child node to be added with the tag and identity, wherein if true the method further comprises:
         determining an identity size of one or more storage station nodes that include identity values up to a predefined threshold in the path from the parent node to the root node;
         assigning a depth value for the child as a sum of determined identity sizes found in the one or more storage stations nodes;
         copying all identities in the parent node to the child node;
         adding the child node's identity if it is unique, and when the child node's identity is unique, incrementing the depth value of the child node by one; and
         marking a tree of the propagation graph associated with the child node and the parent node as infected by a worm if the child node's depth value exceeds some threshold; and
   using the propagation graph for determining at least an approximation of how many HTTP protocol requests for uploading HTML data to the web site have been made, where one or more of the HTTP protocol requests originated and how the HTTP protocol requests are linked, including determining a longest path in the propagation graph and a number of unique identities in the path.

2. The method of claim 1, further comprising:
   sending the uploaded HTML data with the inserted tag to the server for storage;
   receiving another HTTP protocol request from another of the plurality of client systems to download at least a portion of the uploaded HTML data stored on the server;
   downloading the HTML data from the server;
   identifying that the downloaded HTML data includes the tag that uniquely identifies a node within the propagation graph;
   sending the downloaded HTML data to the another client;
   subsequently receiving a new HTTP protocol request to upload other HTML data onto the same web site where the HTML data was previously downloaded with the tag;
   determining a different identity associated with the another of the plurality of client systems;
   creating a different tag that uniquely identifies the uploaded other HTML data;
   inserting the different tag into the uploaded other HTML data;
   mapping the different tag and the different identity to the propagation graph such that the tag and different tag are linked together;
   using the propagation graph for determining at least an approximation of how many HTTP protocol requests for uploading HTML data to the web site have been made, where one or more of the HTTP protocol requests originated, and how the HTTP protocol requests are linked, including determining a longest path in the propagation graph and a number of unique identities in the path; and
   based on the determination, denying or sending the uploaded HTML data with the different tag to the server for storage and subsequent retrieval from one or more of the plurality of client systems.

3. The method of claim 2, wherein the sending of the downloaded HTML data to the another client comprises:
   assigning a HTTP session identifier to the downloaded HTML data such that subsequent HTTP protocol requests associated with the web site include the HTTP session identifier to correlate such HTTP protocol requests with the web site and the propagation graph;
   extracting the tag from the downloaded HTML data; and
   sending the HTTP session identifier and the downloaded HTML data to the another client system.

4. The method of claim 1, wherein the identifying that the HTTP protocol request is used to upload HTML data onto the web site comprises determining that the uploaded HTML code includes at least one HTML element, and wherein inserting the tag into the HTML code comprises inserting the tag into a parameter of the at least one HTML element.

5. The method of claim 1, wherein the method is deployed at one of the server side, the client side, or a proxy between the server side and the client side.

6. The method of claim 1, wherein if the size of identities in the child node equals the predefined threshold, the method further comprises:
designating the child node as a storage station node.

7. The method of claim 6, wherein if the child node has two predecessors in the propagation graph, the method comprises:
comparing depth values stored at each of the multiple predecessors;
selecting a node from the two predecessors with a smaller depth value for the two predecessors and assigning the node as a parent node to the child;
removing the edge between the child and the predecessor node with a larger depth value;
determining an identity size of one or more storage station nodes that include identity values up to the predefined threshold in the path from the parent node to the root node;
assigning a depth value for child as a sum of determined identity sizes found in the one or more storage stations nodes;
copying all identities in the parent node to the child node; and
adding child node's identity if it is unique, wherein if so the method further comprises:
incrementing the depth value of the child node by one, wherein if size of identities in the child node equals the predefined threshold, the method further comprises:
designating the child node as a storage station node.

8. The method of claim 1, wherein when a tree of the propagation graph associated with the child node and the parent node is marked as infected by a worm, the method further comprises: propagating the infected status to each node in the tree, such that all subsequent uploads that are caused by nodes within that tree are denied unless an indication is received that the infection has been resolved.

9. In a distributed computing system, a computer program product for implementing a method of using historical information about data propagation by monitoring HTTP protocol requests to and HTTP protocol replies from a server, the computer program product comprising one or more tangible computer-readable storage media having stored thereon computer-executable instructions that, when executed by one or more processors of a computing system, cause the computing system to perform the following:
receive a HTTP protocol request from one of a plurality of client systems;
identify that the HTTP protocol request is used to upload data onto a web site;
determine that the uploaded data comprises HTML data that includes HTML code;
determine a identity associated with the one of the plurality of client systems;
create a tag that uniquely identifies the uploaded HTML data;
insert the tag into the HTML code;
map the tag and the identity into a propagation graph, which includes nodes and edges associated with a plurality of client systems that made a HTTP protocol request to upload HTML data to the web site, such that each node of the propagation graph corresponds to both a tag and an identity of at least one of the client systems that made a HTTP protocol request to upload HTML data to the web site, and such that edges within the propagation graph represent causality links between the nodes, wherein each node in the propagation graph is configured to store multiple identities, wherein each node has a depth value, which is an approximation of the number of unique identities on the path from that node to the root, and wherein the mapping the tag and the identity into the propagation graph comprises:
identifying if a parent node is an only predecessor of a child node to be added with the tag and identity, wherein if true the method further comprises:
determining a identity size of one or more storage station nodes that include identity values up to a predefined threshold in the path from the parent node to the root node;
assigning a depth value for the child as a sum of determined identity sizes found in the one or more storage stations nodes;
copying all identities in the parent node to the child node;
adding the child node's identity if it is unique, and when the child node's identity is unique, incrementing the depth value of the child node by one; and
marking a tree of the propagation graph associated with the child node and the parent node as infected by a worm if the child node's depth value exceeds some threshold; and
use the propagation graph for determining at least an approximation of how many HTTP protocol requests for uploading HTML data to the web site have been made, where one or more of the HTTP protocol requests originated, and how the HTTP protocol requests are linked, including determining a longest path in the propagation graph and a number of unique identities in the path.

10. The computer program product of claim 9, further comprising:
sending the uploaded HTML data with the inserted tag to the server for storage;
receiving another HTTP protocol request from another of the plurality of client systems to download the at least a portion of the uploaded HTML data stored on the server;
downloading the HTML data from the server;
identifying that the downloaded HTML data includes the tag that uniquely identifies a node within the propagation graph;
sending the downloaded HTML data to the another client;
subsequently receiving a new HTTP protocol request to upload other HTML data onto the same web site where the HTML data was previously downloaded with the tag;
determining a different identity associated with the another of the plurality of client systems;
creating a different tag that uniquely identifies the uploaded other HTML data;
inserting the different tag into the uploaded other HTML data;
mapping the different tag and the different identity to the propagation graph such that the tag and different tag are linked together;
using the propagation graph for determining at least an approximation of how many HTTP protocol requests for uploading HTML data to the web site have been made, where one or more of the HTTP protocol requests originated, and how the HTTP protocol requests are linked, including determining a longest path in the propagation graph and a number of unique identities in the path; and based on the determination, denying or sending the uploaded HTML data with the different tag to the server for storage and subsequent retrieval from one or more of the plurality of client systems.

11. The computer program product of claim 10, wherein the sending of the downloaded HTML data to the another client comprises:
assigning a HTTP session identifier to the downloaded HTML data such that subsequent HTTP protocol requests associated with the web site include the HTTP session identifier to correlate such HTTP protocol requests with the web site and the propagation graph;
extracting the tag from the downloaded HTML data; and
sending the HTTP session identifier and the downloaded HTML data to the another client system.

12. The computer program product of claim 11, wherein the another client system includes a browser plug-in in order to provide propagation of the tags and HTTP session identifier at a HTTP data transfer protocol layer so that applications cannot modify the tags or HTTP session identifiers.

13. The computer program product of claim 9, wherein the identity is an IP address for the client that requested to upload the HTML data.

14. The computer program product of claim 9, wherein each node in the propagation graph represents a unique identity for each of the plurality of client systems.

15. The computer program product of claim 9, wherein the propagation graph is used to dynamically check for cross-site scripting vulnerabilities such that if a length from a root node to another node of the propagation graph grows beyond a predetermined threshold, further upload requests will be denied.

16. The computer program product of claim 9, wherein the identifying that the HTTP protocol request is used to upload HTML data onto the web site comprises determining that the uploaded HTML code includes at least one HTML element, and wherein inserting the tag into the HTML code comprises inserting the tag into a parameter of that at least one HTML element.

17. The computer program product of claim 16, wherein the tag is included in a first HTML element within the parameter.

18. The computer program product of claim 9, wherein the method is deployed at one of the server side, the client side, or a proxy between the server side and the client side.

19. The computer program product of claim 9, wherein if the child node has more than one predecessors in the propagation graph, the method comprises:
comparing depth values stored at each of the two predecessors;
selecting a node from the two predecessors with a smaller depth value for the two predecessors and assigning the node as a parent node to the child;
removing the edges between the child and the predecessors with a depth value larger than the minimum;
determining a identity size of one or more storage station nodes that include identity values up to the predefined threshold in the path from the parent node to the root node;
assigning a depth value for the child node as a sum of determined identity sizes found in the one or more storage stations nodes;
copying all identities in the parent node to the child node;
adding the child node's identity if it is unique, wherein if so the method further comprises incrementing the depth value of the child node by one, wherein if size of identities in the child node equals the predefined threshold, the method further comprises designating the child node as a storage station node, and wherein if the added child node's depth value exceeds some threshold, the method further comprises:
marking a tree of the propagation graph associated with the child node and the parent node as infected by a worm; and
propagating the infected status to each node in the tree, such that all subsequent uploads that are caused by nodes within that tree are denied unless an indication is received that the infection has been resolved.

\* \* \* \* \*